(12) United States Patent
Ford

(10) Patent No.: US 7,850,187 B1
(45) Date of Patent: Dec. 14, 2010

(54) MOTORCYCLE RIGHTING APPARATUS

(76) Inventor: Warren L. Ford, P.O. Box 1344, Orting, WA (US) 98360

( * ) Notice: Subject to any disclaimer, the term of this patent is extended or adjusted under 35 U.S.C. 154(b) by 417 days.

(21) Appl. No.: 12/034,314

(22) Filed: Feb. 20, 2008

(51) Int. Cl.
*B62H 7/00* (2006.01)
(52) U.S. Cl. ...................... 280/293; 280/303
(58) Field of Classification Search ............. 280/288.4, 280/293, 292, 291, 303, 304.3, 304.4, 755, 280/764.1
See application file for complete search history.

(56) References Cited

U.S. PATENT DOCUMENTS

| | | | | |
|---|---|---|---|---|
| 2,126,752 A | * | 8/1938 | Devine et al. | 280/304.3 |
| 2,171,042 A | * | 8/1939 | Minton | 280/293 |
| 4,145,069 A | * | 3/1979 | Kissick | 280/303 |
| 4,358,127 A | * | 11/1982 | Kissick | 280/303 |
| 4,377,295 A | * | 3/1983 | Lemman | 280/303 |
| 4,637,624 A | | 1/1987 | Shur | |
| 4,826,194 A | * | 5/1989 | Sakita | 285/302 |
| 5,118,126 A | * | 6/1992 | Yaple | 280/293 |
| 5,358,265 A | * | 10/1994 | Yaple | 280/293 |
| 6,758,484 B1 | * | 7/2004 | Rice | 280/304.4 |
| 6,945,549 B1 | * | 9/2005 | Hare | 280/293 |
| 7,083,181 B2 | * | 8/2006 | Lindby | 280/291 |
| 7,108,273 B2 | * | 9/2006 | Hunwardsen | 280/291 |

* cited by examiner

*Primary Examiner*—Hau V Phan
(74) *Attorney, Agent, or Firm*—David L. Tingey

(57) ABSTRACT

The invention includes a righting and kickstand device to support a motorcycle by connection with a lower intermediate frame section of the motorcycle with the device angled downwardly toward the ground to support the motorcycle tilted at an angle toward the device. In the preferred embodiment, the device includes a fluid actuated cylinder connected to the motorcycle with a pivot connection device. A piston rod extends from the cylinder with a foot device structurally attached to the lower end of the piston rod with the foot device designed to rest on the ground. A fluid pressure device is provided to supply fluid pressure to the cylinder to force the piston rod to its downward position.

20 Claims, 11 Drawing Sheets

MOTORCYCLE RIGHTING APPARATUS

BACKGROUND OF THE INVENTION

1. Field of the Invention

This invention relates to a motorcycle righting apparatus, and more particularly, a device installed unobtrusively on a motorcycle that upon actuation raises a fallen motorcycle hands-free to its normal upright position.

2. Prior Art

Motorcycles vary in size and weight. For heavy motorcycles, a rider may be unable to lift the motorcycle if it should fall over, or at least such a person could expose himself or herself to personal injury and to injury to the motorcycle in attempting to right the motorcycle.

Previous devices designed to right a fallen motorcycle have involved a kickstand. However a kickstand would appear to be not useful unless the motorcycle falls on the side where the kickstand is located. It is also of little use if the kickstand cannot be easily rotated to its support position for actuation of the righting device. It also raises the motorcycle only partially and requires the user to complete the righting through the user's own lifting effort.

The primary object of the present invention is to provide an apparatus that raises a motorcycle that has fallen or has tipped over to its upright position. It is also an object that the apparatus be functional regardless of which side the motorcycle has fallen. It is a further object that the apparatus be unobtrusively installed such that the general aesthetic appearance of the motorcycle not be diminished. It is yet a further object that the apparatus right the motorcycle to a fully upright position without any lifting effort of the rider. It is a final object that the apparatus lift and support the motorcycle in its fully upright position from both sides of the motorcycle

SUMMARY OF THE INVENTION

The invention includes a righting device that lifts a motorcycle hands-free from either side of the motorcycle and then supports the motorcycle from both sides. The device connects to the motorcycle frame primarily using bolts at the engine motor mount. The device installs intermediate the motorcycle between the motor and the front wheel, approximately below the handlebar neck. The device includes a member that moves substantially vertically to move another member downward against the ground simultaneously on both sides of the motorcycle to provide support for lifting the motorcycle and for preventing the motorcycle from falling over onto the other side as a result of being lifted, all hands-free. Representative of the vertically moving member is a hydraulic cylinder. In the primary embodiment, the member moving against the ground has the general form of an engine guard, also sometimes referred to casually as an engine guard. However, unlike an engine guard, the member is mounted pivotably at its lowest point and upon actuation moves away from its releasable connection at his highest point as it rotates at its bottom connection.

DETAILED DESCRIPTION OF THE PREFERRED EMBODIMENTS

Figure 1:
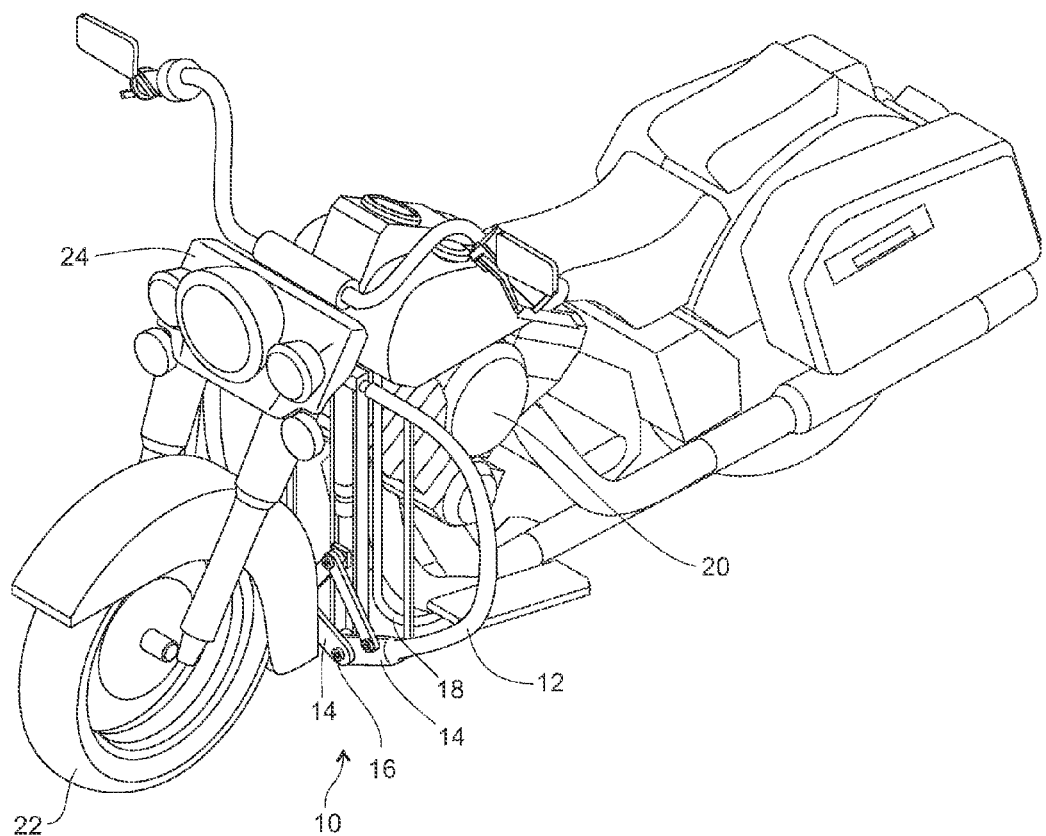
FIG. 1 is a perspective view of a motorcycle with the righting apparatus of the present invention.
Figure 2:
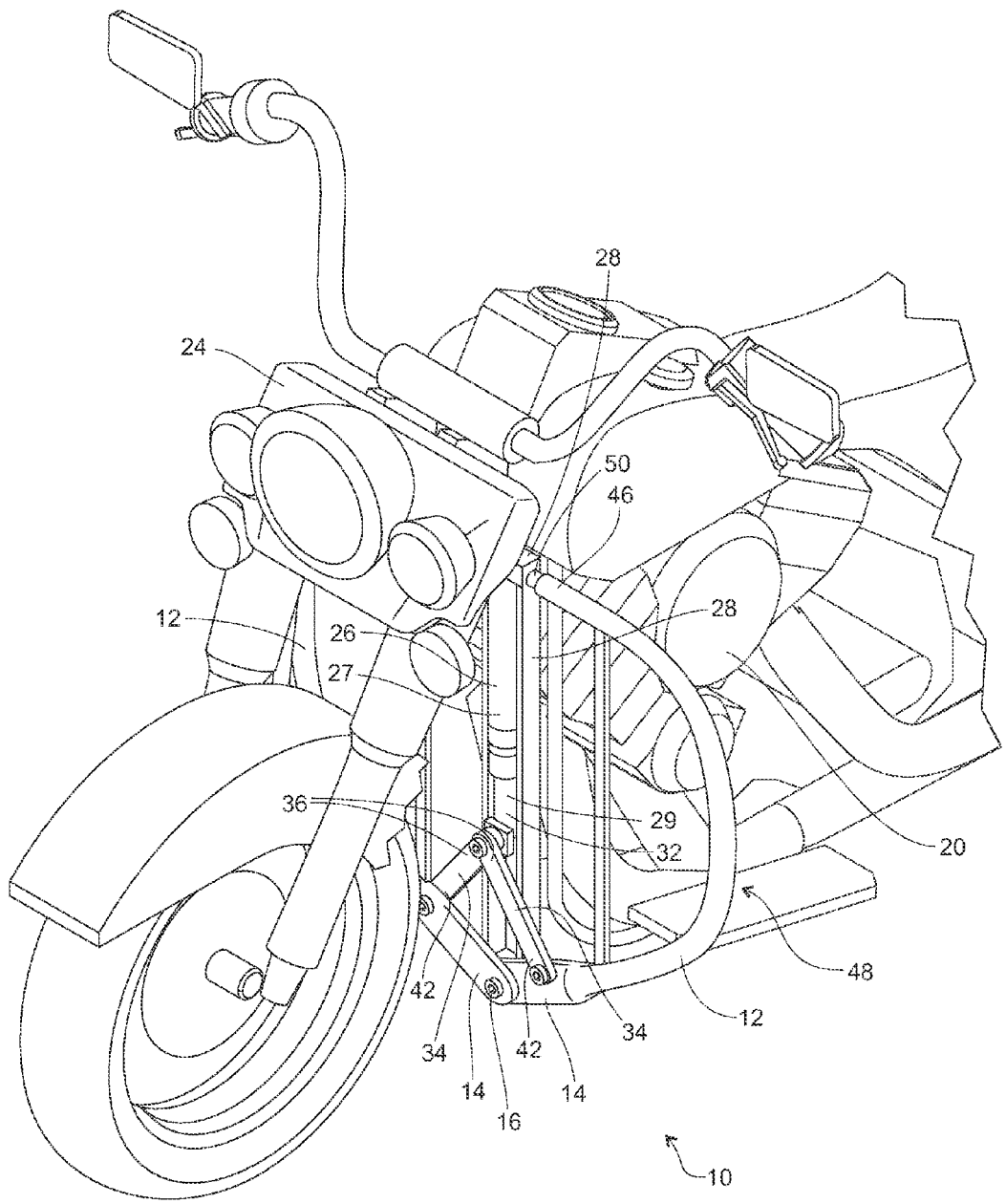
FIG. 2 is a close-up perspective view of the righting apparatus in its raised position, suitable for riding the motorcycle.
Figure 3:
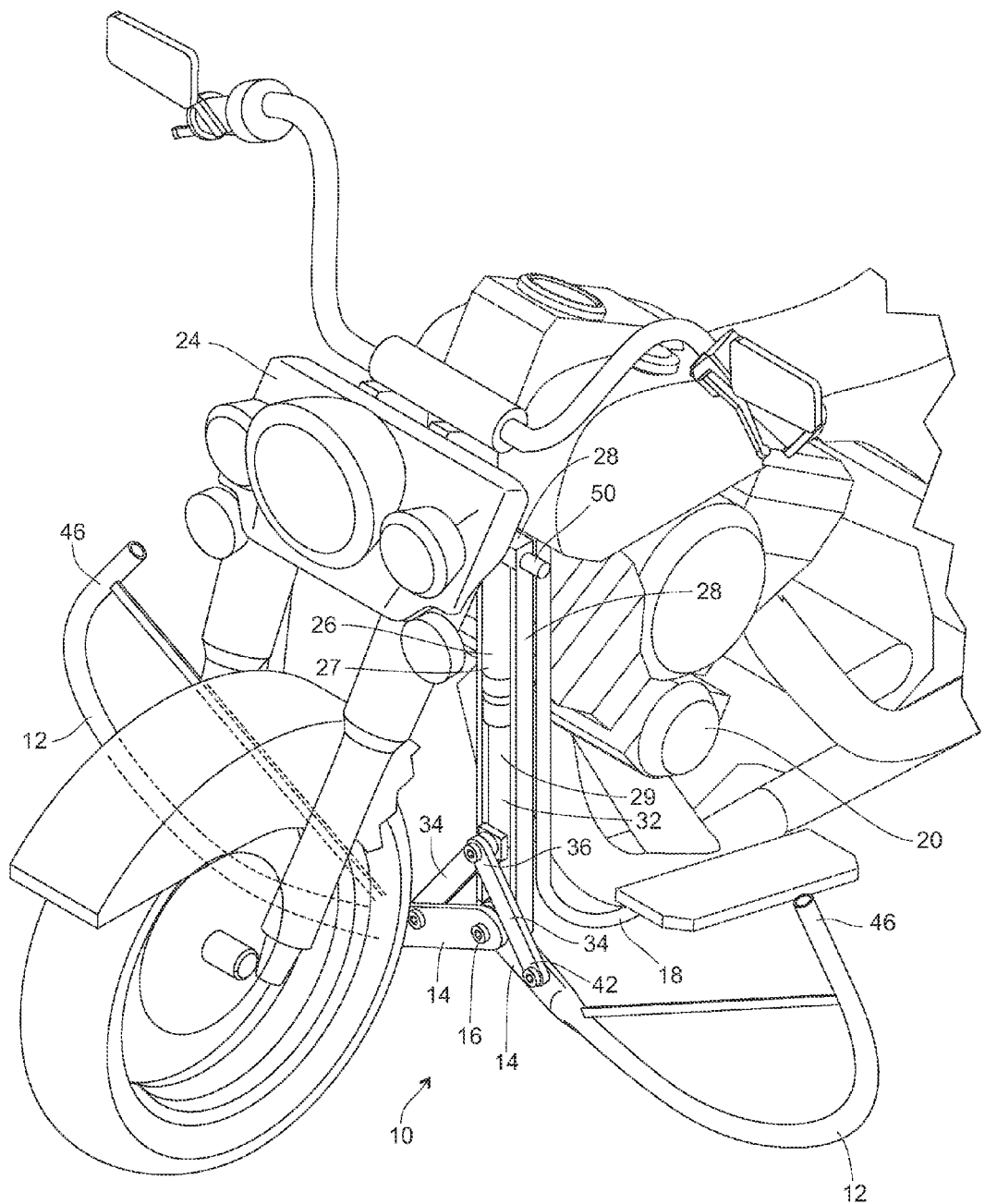
FIG. 3 is a close-up perspective view of the righting apparatus in its lowered position, suitable for supporting the motorcycle.
Figure 4:
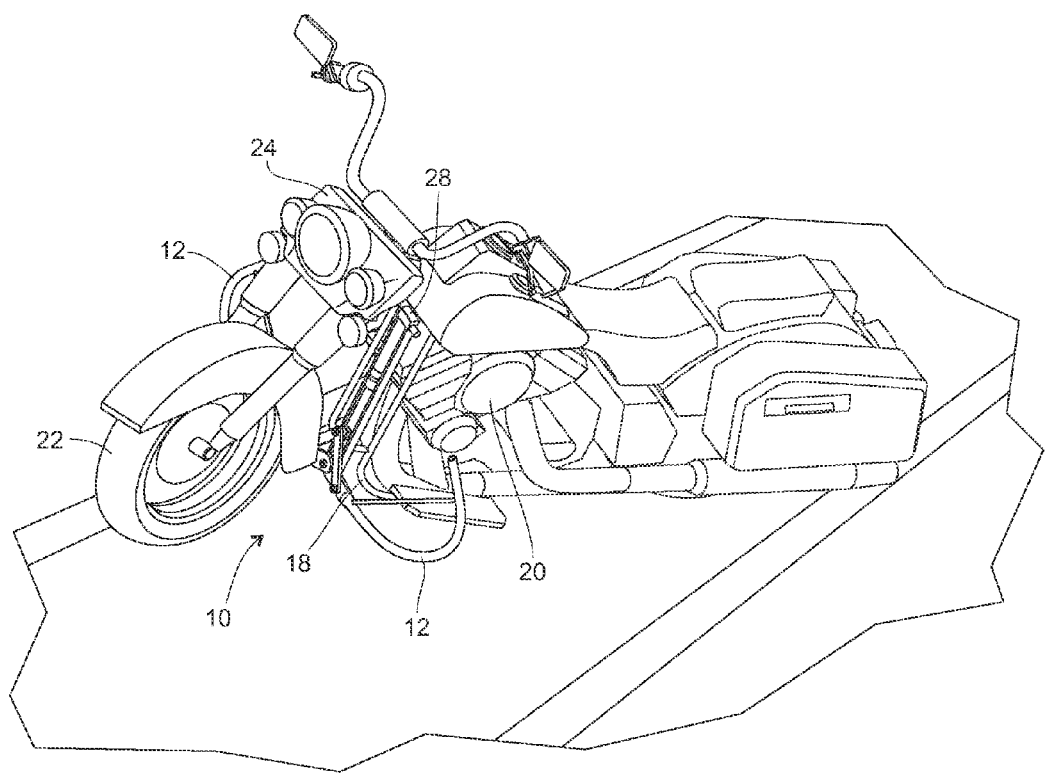
FIG. 4 is a perspective view of the righting apparatus in its raised position with the motorcycle on its side, after tipping over or falling.
Figure 5:
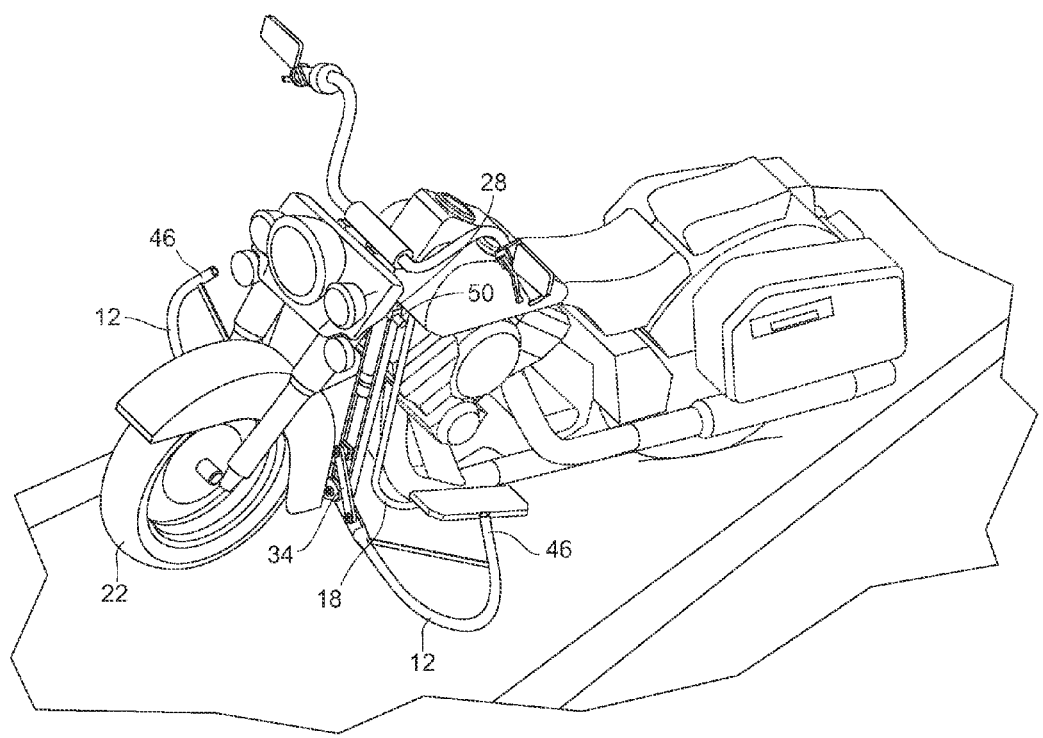
FIG. 5 is a perspective view of the motorcycle and righting apparatus of FIG. 4 with the righting apparatus partially extended and the motorcycle partially righted, supported on one side by the righting apparatus and by the rear wheel of the motorcycle.
Figure 6:
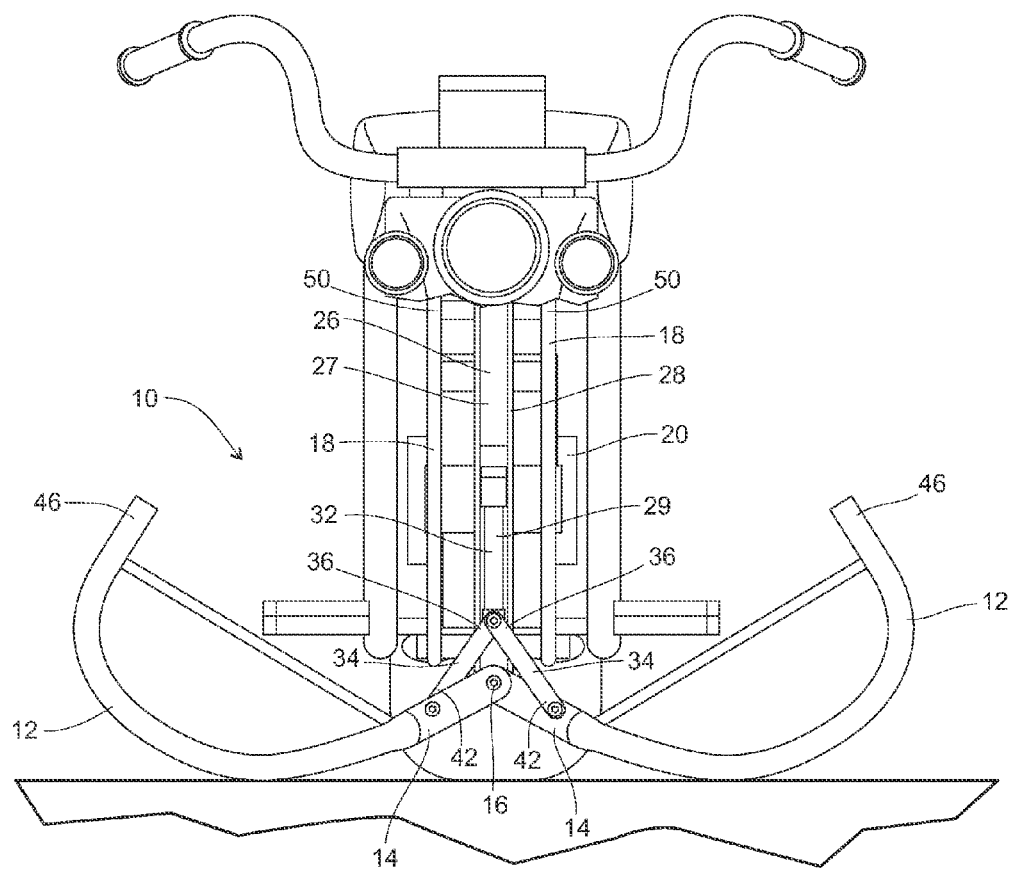
FIG. 6 is a front view of the motorcycle and righting apparatus of FIG. 4 with the righting apparatus fully extended and the motorcycle fully righted, supported on both sides by the righting apparatus and by the rear wheel of the motorcycle.
Figure 7:
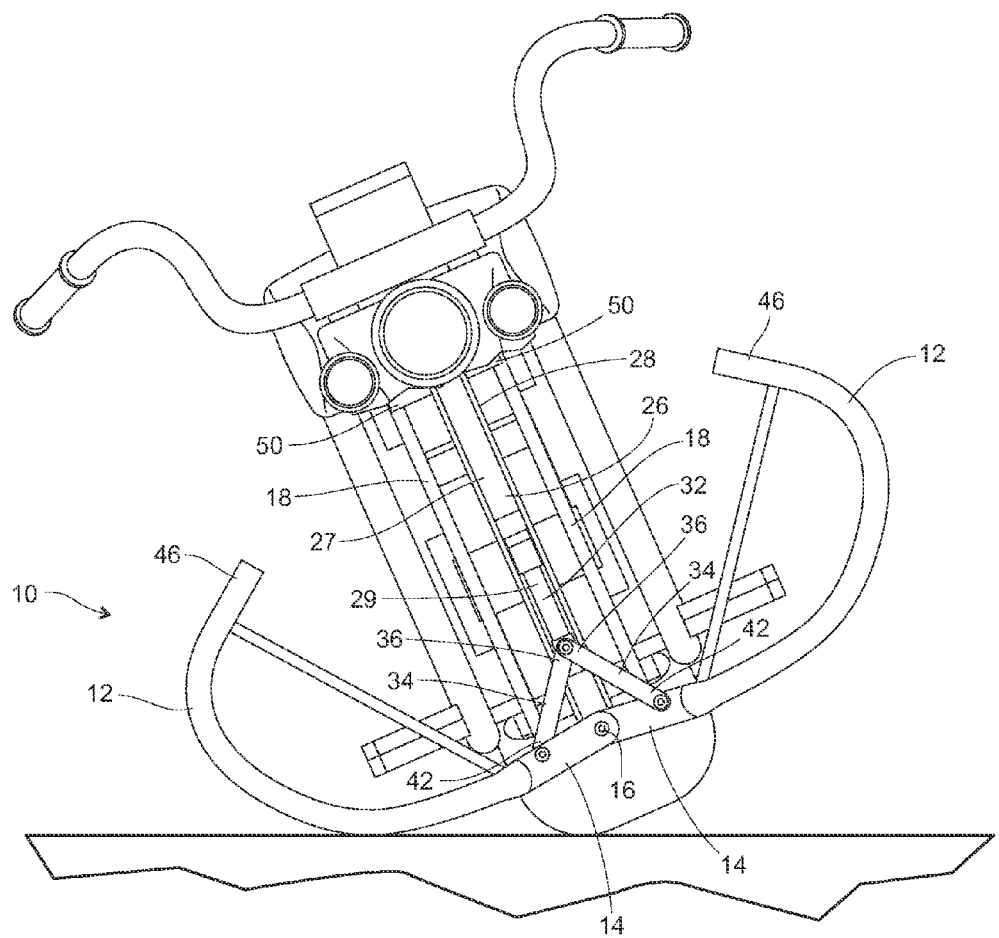
FIG. 7 is a front view of the motorcycle and righting apparatus of FIG. 6 with the righting apparatus partially extended and the motorcycle partially supported from one side.
Figure 8:
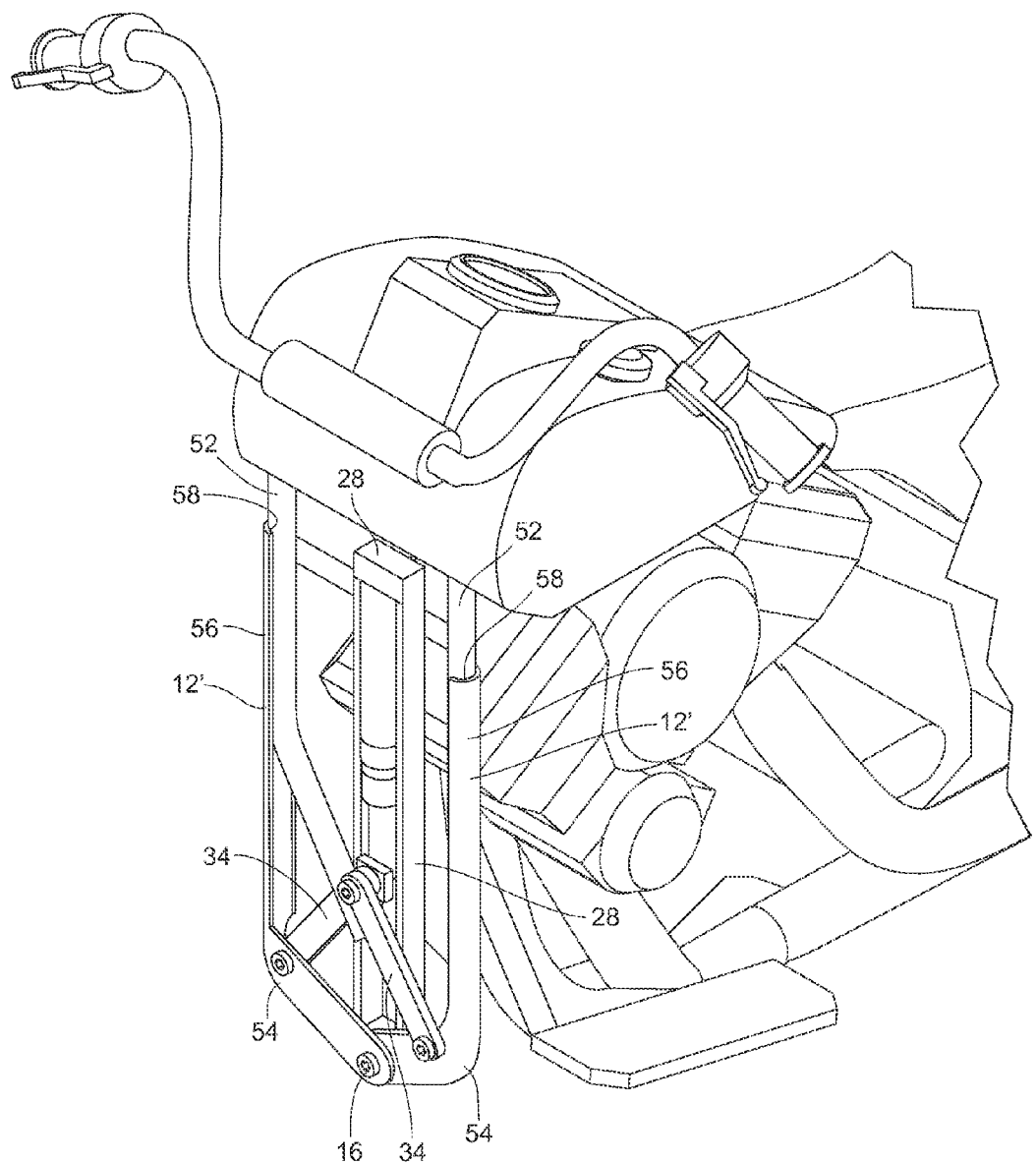
FIG. 8 is a perspective view of an alternate embodiment showing a substantially straight support member with a channel that inconspicuously fits over substantially vertical motorcycle frame members.
Figure 9:
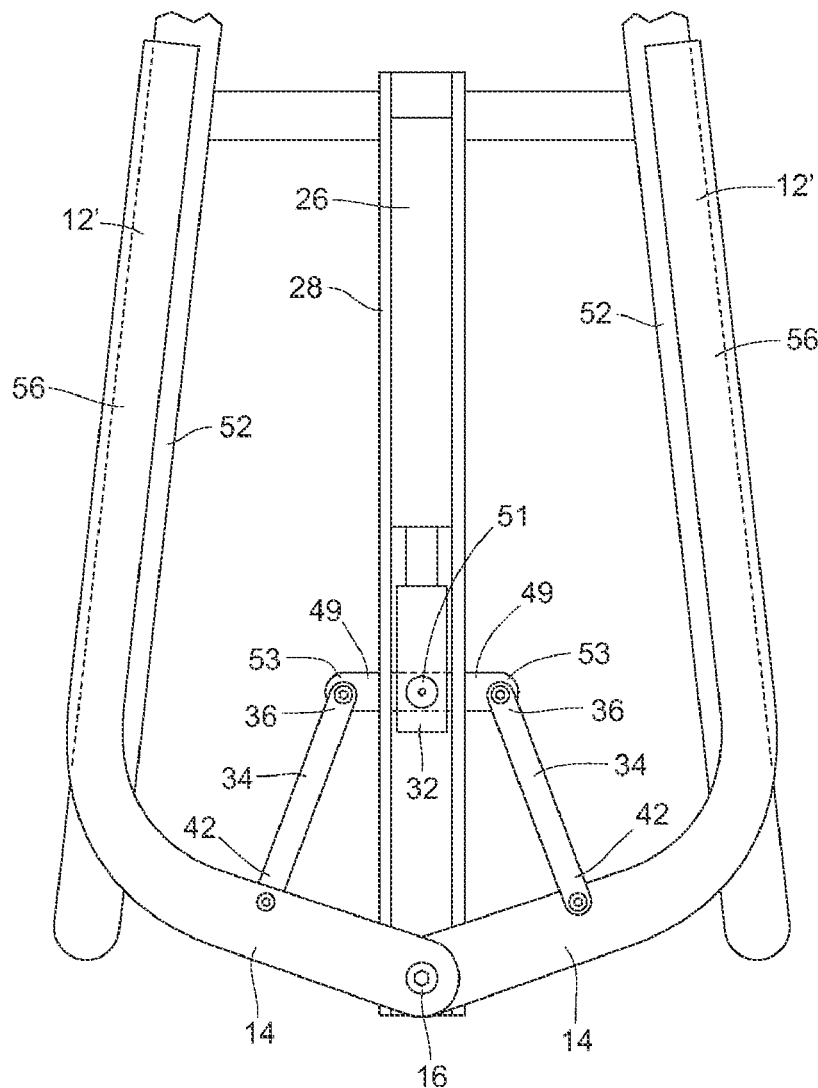
FIG. 9 is a front view of the alternate embodiment of FIG. 8.
Figure 10:
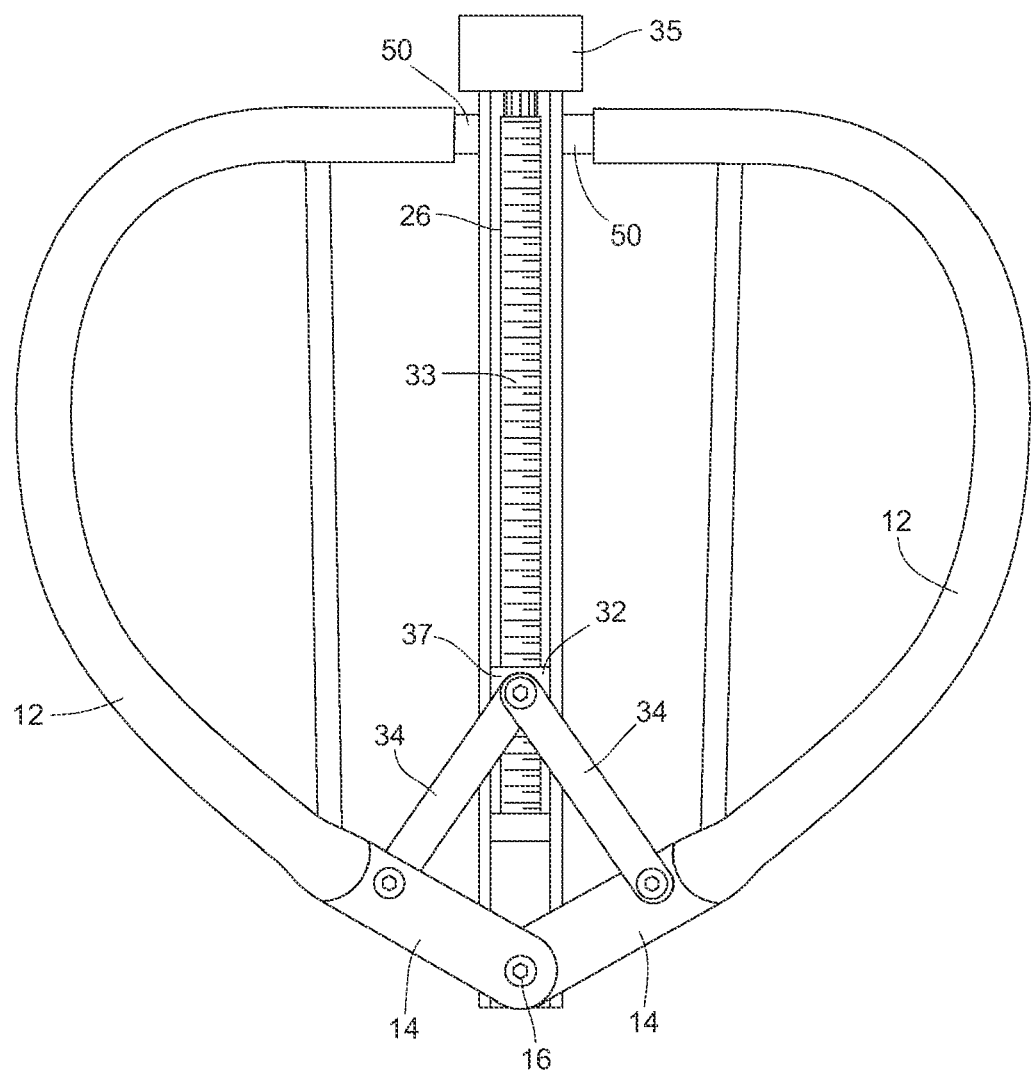
FIG. 10 is an alternate embodiment showing the actuator as a threaded bolt with a matching nut.
Figure 11:
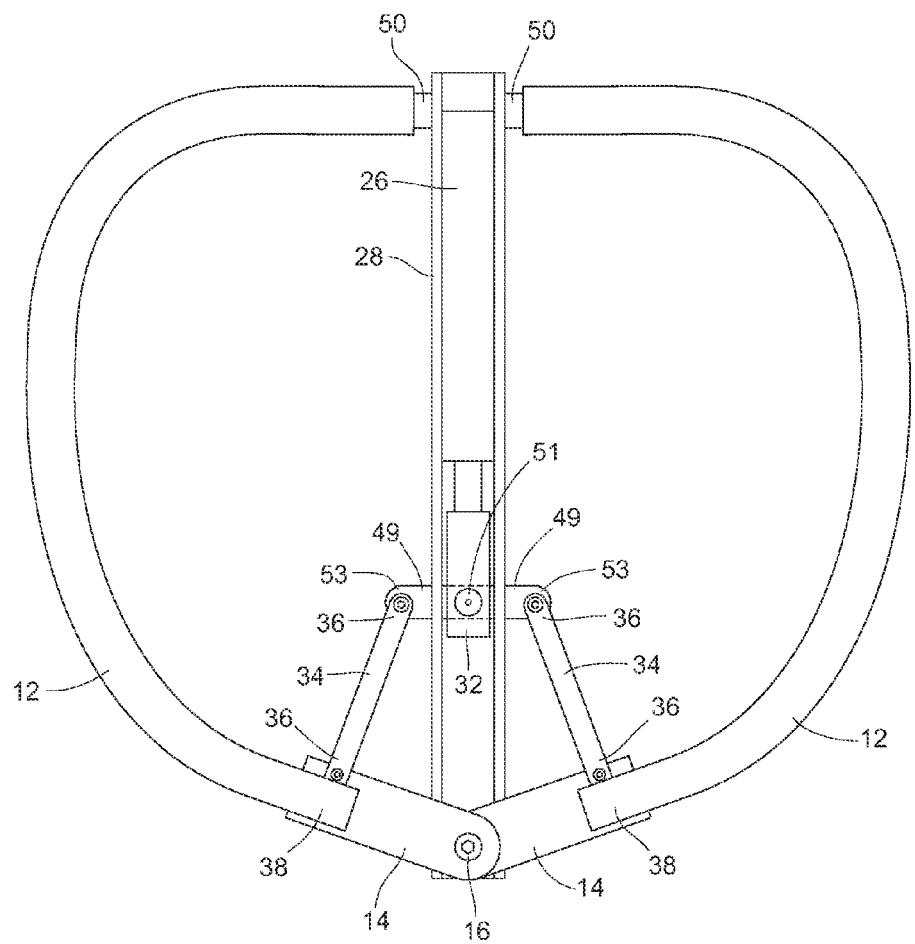
FIG. 11 is a front view of the righting apparatus of FIG. 1, further employing a horizontal bar on the rod extending from a hydraulic cylinder.

The motorcycle righting apparatus 10 of the present invention comprises an engine guard as a support member 12 on each side of the motorcycle. (In the following description, because in the primary embodiment support member is an engine guard, the two terms "support member" and "engine guard" are used together or interchangeably unless clearly indicated otherwise.) The lower, or first end 14 of each support member 12 of the motorcycle left and right sides rotates on a pivot bolt 16 that is substantially horizontal. The pivot bolt 16 is low at approximately the lowest level of the motorcycle frame 18 so the support member (engine guard) 12 can lift the motorcycle from the pivot bolt 16 close to the ground but not lower than the motorcycle frame 18, which would unnecessarily introduce a road clearance problem during travel. The pivot bolt 16 is located forward of the engine 20 and rearward from the front wheel 22 of the motorcycle, approximately under the motorcycle handle bar neck 24. The support members 12 rotate on the pivot bolt 16 under control of a single actuator 26. An actuator frame 28 is secured to the motorcycle frame 18 typically at the engine motor mounts (not shown) to not compromise or alter the motorcycle frame 18. (It is important not to modify the motorcycle frame; doing so would likely nullify a warranty on the motorcycle.) The actuator 26 is secured to a vertical portion of the actuator frame 28 and the pivot bolt 16 is secured low in the actuator frame 28. The actuator 26 moves substantially vertically. The actuator 26 in this primary embodiment is typically a hydraulic cylinder 27 with a rod 29 as an actuator member 32 extending from the hydraulic cylinder. The actuator 26 may also be a threaded rod 33 driven by an electric motor 35 to rotate in a matching threaded nut 37 as the actuator member 32 moves upward on the bolt or threaded or rod 33, the threaded tube or nut then being similar in affect to the hydraulic cylinder rod 29. The actuator 26 may also be an electric motor in combination with gears and a rod with a rack of matching teeth that move the rod vertically also (not shown). These and other mechanisms that effect a substantially vertical movement of an actuator member 32 are all deemed included in this description. They are all known in the art and do not require a further description. For ease of description, all of these mechanisms are represented by the rod and hydraulic cylinder and for these purposed all such mechanisms are deemed included in this invention.

A brace bar 34 is connected between the actuator member 32 on a brace bar first end 36 and a position 38 intermediate the support member, engine guard 12 on the lower, or first end 40 of the engine guard 12 on a brace bar second end 42. Thus, when the actuator member 32 is lowered the engine guard 12 also is lowered as the brace bar 34 pushes against it. In moving downward from a travel position suitable for motorcycle travel, the engine guards 12 rotate on the pivot bolt 16 through a substantially vertical plane into engagement with the ground and then further downward thereby lifting the motorcycle as the engine guard 12 pushes against the ground. As both support members 12 move from their respective travel positions simultaneously, one support member rights the motorcycle, and the other support members 12 prevents the motorcycle from tipping over again on the other side. Thus, the user can right his or her motorcycle hands free, that is, without intervention or lifting action of the user. All the user need do is turn a switch to cause the actuator 26 to be actuated.

The engine guard 12 extends outward from the motorcycle side with an engine guard lower, or first end 44 connected to the pivot bolt 16. The engine guard second end 46 curves back toward the motorcycle and abuts against the actuator frame 28 in the engine guard travel position 48. With the extended nature of the engine guard 12, the engine guard 12 supports the motorcycle when the motorcycle is on its side and rights the motorcycle as the engine guard first end 44 moves away from the actuator frame 23 and pushes against the ground. Typically, a horizontal bar 49 intermediate the actuator member 32 and the respective support members 12 laterally extends the connection of the brace bar first ends 36 to the actuating member 32 with its center 51 attached to the actuator member 32 and its ends 53 attached to first ends 36 of the brace bars 34, thereby orienting the brace bar 34 more vertically. To stabilize the engine guard second end 46 in its travel position a centering post 50 on each motorcycle side extends substantially horizontally from the actuator frame 28. The engine guard second end 46 is tubular and receives the centering post 50. In practice, the entire engine guard 12 is tubular except at its lower end where it attaches to the pivot bolt 16.

In an alternate embodiment, the motorcycle frame comprises a substantially vertical frame leg 52 on each motorcycle side and the support member 12' is substantially straight except at its lower end 54 where it curves to meet the pivot bolt 16. The straight portion 56 comprises a channel 58 that receives a portion of the frame leg 52 therein.

Thus the support member 12' is stabilized in its travel position against the motorcycle frame and as important, it is inconspicuous and disguised and is thus aesthetically pleasing.

The invention claimed is:

1. A motorcycle righting apparatus, comprising:
   a substantially horizontal pivot bolt;
   a support member on at least one side of the motorcycle with a support member first end rotatable on the pivot bolt;
   an actuator with an actuator member moving substantially vertically, the actuator member functionally connected to the support member first end such that when the actuator is actuated to move the actuator member, the support member rotates on the pivot bolt from a travel position on the motorcycle downward through a substantially vertical plane into engagement with the ground and then downward further thereby lifting the motorcycle as the support member pushes against the ground, the support member in the travel position being suitable for motorcycle travel,
   a brace bar extending between the actuator member on a brace bar first end and a position intermediate the support member on a brace bar second end such that as the actuator moves the actuator member downward the brace bar causes the support member to move downward.

2. The motorcycle righting apparatus of claim 1 further comprising a support member and actuator on both a left and a right side of the motorcycle, both support members rotatable on said pivot bolt.

3. The motorcycle righting apparatus of claim 2 wherein both support members move from their respective travel positions simultaneously.

4. The motorcycle righting apparatus of claim 3 such that as the motorcycle is righted both support members extend such that they prevent the motorcycle from tipping over again without intervention or lifting action of a user, righting of the motorcycle being a hands-free operation.

5. The motorcycle righting apparatus of claim 2 wherein said pivot bolt is secured to the motorcycle frame forward of the engine and rearward of the front wheel.

6. The motorcycle righting apparatus of claim 5 wherein said support members each comprise an engine guard extending outward from a motorcycle side with an engine guard first end connected to said pivot bolt and an engine guard second end curving back toward the motorcycle.

7. The motorcycle righting apparatus of claim 6 wherein in the engine guard travel position the engine guard second end abuts against an actuator frame that is secured to the motorcycle frame.

8. The motorcycle righting apparatus of claim 7, wherein the engine guard lifts the motorcycle when the motorcycle has fallen on its side by the engine guard second end moving away from the actuator frame as the engine guard first end rotates on the pivot bolt thereby lifting the motorcycle as the engine guard pushes against the ground.

9. The motorcycle righting apparatus of claim 8 further comprising a centering post extending from the actuator frame on each motorcycle side, the engine guard second end being tubular and receiving the centering post therein stabilizing the engine guard second end in its travel position.

10. The motorcycle righting apparatus of claim 9 further comprising a horizontal bar intermediate the actuator member and the respective support members with its center attached to the actuator member and its ends attached to first ends of the brace bars, the horizontal bar laterally extending the connection of the brace bar first ends to the actuating member thereby orienting the brace more vertically.

11. The motorcycle righting apparatus of claim 6 wherein the actuator causes the actuating member to rotate, the support members from respective sides of the motorcycle each mechanically linked to the actuating member such that they rotate downward together until the motorcycle is righted.

12. The motorcycle righting apparatus of claim 6 wherein the engine guards in their travel position extending from the motorcycle on each side are adapted to mitigate damage to the motorcycle in a fall.

13. The motorcycle righting apparatus of claim 6 wherein the engine guards aesthetically and functionally simulate engine guards that attach at both engine guard ends to the motorcycle.

14. The motorcycle righting apparatus of claim 1 wherein the motorcycle frame comprises a substantially vertical frame leg on each motorcycle side and the support bar comprises a channel portion that receives a portion of the frame leg therein, inconspicuously disguising the support bar over the frame leg on each side of the motorcycle when the support bar is in its travel position.

15. A motorcycle righting apparatus, comprising:
a substantially horizontal pivot bolt;
a support member on each side of the motorcycle each with a support member first end rotatable on the pivot bolt;
single actuator with an actuator member moving substantially vertically, the actuator member functionally connected to each support member first end such that when the actuator is actuated to move the actuator member, each support member rotates together with the other support member on the pivot bolt from a travel position on the motorcycle downward through a substantially vertical plane into engagement with the ground and then downward further thereby lifting the motorcycle as the support member pushes against the ground, the support member in the travel position being suitable for motorcycle travel;
wherein both support members move together from their respective travel positions such that as the motorcycle is righted both support members prevent the motorcycle from tipping over again without intervention or lifting action of a user.

16. The motorcycle righting apparatus of claim 15 wherein the actuator is a hydraulic cylinder and the actuator member is a rod extending from the hydraulic cylinder.

17. The motorcycle righting apparatus of claim 16 further comprising an actuator frame receiving the hydraulic cylinder therein.

18. The motorcycle righting apparatus of claim 17 further comprising a centering post extending from each side of the actuator frame and a tubular second end of each support member releasably receiving the centering post therein at the travel position.

19. The motorcycle righting apparatus of claim 15 wherein the actuator causes the actuator member to move substantially vertically and further comprising a brace bar extending between the actuator member on a brace bar first end and a position intermediate the support member on a brace bar second end such that as the actuator moves the actuator member downward the brace bar causes the support member to move downward.

20. The motorcycle righting apparatus of claim 15 further comprising a centering post extending from the actuator frame on each motorcycle side, the engine guard second end being tubular and receiving the centering post therein stabilizing the engine guard second end in its travel position.

* * * * *